(12) United States Patent
Shippy et al.

(10) Patent No.: US 6,226,722 B1
(45) Date of Patent: May 1, 2001

(54) INTEGRATED LEVEL TWO CACHE AND CONTROLLER WITH MULTIPLE PORTS, L1 BYPASS AND CONCURRENT ACCESSING

(75) Inventors: David James Shippy; David Benjamin Shuler, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/245,786

(22) Filed: May 19, 1994

(51) Int. Cl.$^7$ ........................................... G06F 12/08
(52) U.S. Cl. ................................................ 711/168
(58) Field of Search ........................ 395/308, 403, 395/449, 455, 458, 465, 476, 494, 495

(56) References Cited

U.S. PATENT DOCUMENTS

| | | | |
|---|---|---|---|
| 4,797,814 | * 1/1989 | Brenza | 395/403 |
| 4,823,259 | * 4/1989 | Aichelmann et al. | 395/449 |
| 5,155,828 | * 10/1992 | La Fetra et al. | 395/449 |
| 5,202,972 | * 4/1993 | Gusefski et al. | 395/450 |
| 5,210,845 | * 5/1993 | Crawford et al. | 395/455 |
| 5,214,765 | * 5/1993 | Jensen | 395/449 |
| 5,261,066 | * 11/1993 | Jouppi et al. | 395/449 |
| 5,345,576 | * 9/1994 | Lee et al. | 395/308 |

FOREIGN PATENT DOCUMENTS 2011678A 7/1979 (GB).

OTHER PUBLICATIONS

IBM TDB "Processor Performance Enhancement Using A Memory Cache Scheme", vol. 32, No. 6A, Nov. 1989, pp. 373–379.

\* cited by examiner

*Primary Examiner*—Kevin L. Ellis
(74) *Attorney, Agent, or Firm*—Mark E. McBurney; Leslie A. Van Leeowen (57) ABSTRACT

A memory system wherein data retrieval is simultaneously initiated in both and L2 cache and main memory, which allows memory latency associated with arbitration, memory DRAM address translation, and the like to be minimized in the event that the data sought by the processor is not in the L2 cache (miss). The invention allows for any memory access to be interrupted in the storage control unit prior to any memory signals being activated. The L2 and memory access controls are in a single component, i.e. the storage control unit (SCU). Both the L2 and the memory have a unique port into the CPU which allows data to be directly transferred. This eliminates the overhead associated with storing the data in an intermediate device, such as a cache or memory controller.

20 Claims, 8 Drawing Sheets

INTEGRATED LEVEL TWO CACHE AND CONTROLLER WITH MULTIPLE PORTS, L1 BYPASS AND CONCURRENT ACCESSING

BACKGROUND OF THE INVENTION

1. Field of the Invention

The present invention generally relates to a data processing system wherein the processor initiates parallel access to a level 2 (L2) cache and main memory. More specifically, parallel access is initiated and if the instructions or data are found in the L2 cache, the memory access is aborted before the memory is accessed. Additionally, a novel non-hierarchical memory scheme is disclosed for processor load operations wherein two unique data ports are provided to the processor.

2. Description of Related Art

Many modern computer architectures use a hierarchy of storage elements for fast access to data and instructions. Typically a level 1 (L1) cache is integrated into the central processing unit (CPU) and provides a small (8 kilobytes to 256 kilobytes) fast access storage which can run simultaneously with the CPU. A level 2 cache provides a larger cache with more storage and is located between the L1 cache and the level 3 (L3) main memory (external to the CPU). The L2 cache normally runs at the same speed as the CPU clock and is made up of static random access memory (SRAM). The main memory is several cycles behind the CPU clock speed, due to the slower dynamic random access memory (DRAM) which is used, address translation, arbitration and the like.

Conventional three level memory hierarchy systems have a cache control unit for the L2 cache and a separate storage control unit for main memory. Cache misses occur when the data or instructions that the CPU needs are not in the cache. Normally, L1 cache misses are sent to the L2 cache control unit, which then checks the L2 cache for a hit (desired data or instruction is in the L2 cache). If a L2 miss occurs the request is then sent to the storage control unit to fetch the data from main memory. These events occur sequentially and may cause a substantial amount of idle time for the CPU. That is, a time penalty occurs due to the amount of time needed for the data request to go to the L2 cache, and if a miss occurs to then check the main memory for the data.

In order to minimize the amount of CPU idle time, U.S. Pat. No. 4,663,440 shows a hierarchical memory system wherein a low level memory includes a dual port access to the memory chip(s). A high level memory is also included which interacts serially with one port of the low level memory. This enables serial access of the low level memory by the high level memory to occur in parallel with access of the low level memory by a computer system. However, this system does not disclose concurrent access of different levels of memory when a data miss occurs. European Patent Application 0 468 786 A2 describes a memory system with a separate cache controller and memory controller. A microprocessor initiates a search for data in both the cache and main memory simultaneously. If the data is not found in the cache, then the data can be retrieved from main memory without the penalty of cache lookup latency. However, if the data is found in the cache, then the data need not be retrieved from memory and the access to the memory controller is cancelled. The memory controller then terminates the previously initiated search in main memory by asserting a "hit" line, or deasserting a "miss" line. Either of these actions by the memory controller would communicate the need to terminate the main memory access cycle because the data was found in the cache. Thus, it can be seen that this existing system begins accessing the main memory by arbitrating for the bus, translating memory addresses, searching memory locations which all use memory cycles, i.e. the memory is incapable of being used during the period when these activities are occurring. Therefore, each time the microprocessor searches the cache and memory simultaneously, the memory is accessed and becomes incapable of being used in any other process, such as a direct memory access transfer (DMA) from a peripheral controller, or the like, even when the data is found in the cache. This causes the problem of tying up the memory even when the data is found in the cache.

U.S. Pat. No. 3,896,419 shows a typical processor with an L1 cache and memory. This system checks the cache for the data while a memory retrieval operation is being processed. If the data is found in the cache, the retrieval from memory is blocked. However, a port cycle for retrieving data from the memory must be cancelled when data is found in the cache. Thus, memory operations are impacted even when the data is found in the cache.

Figure 1:
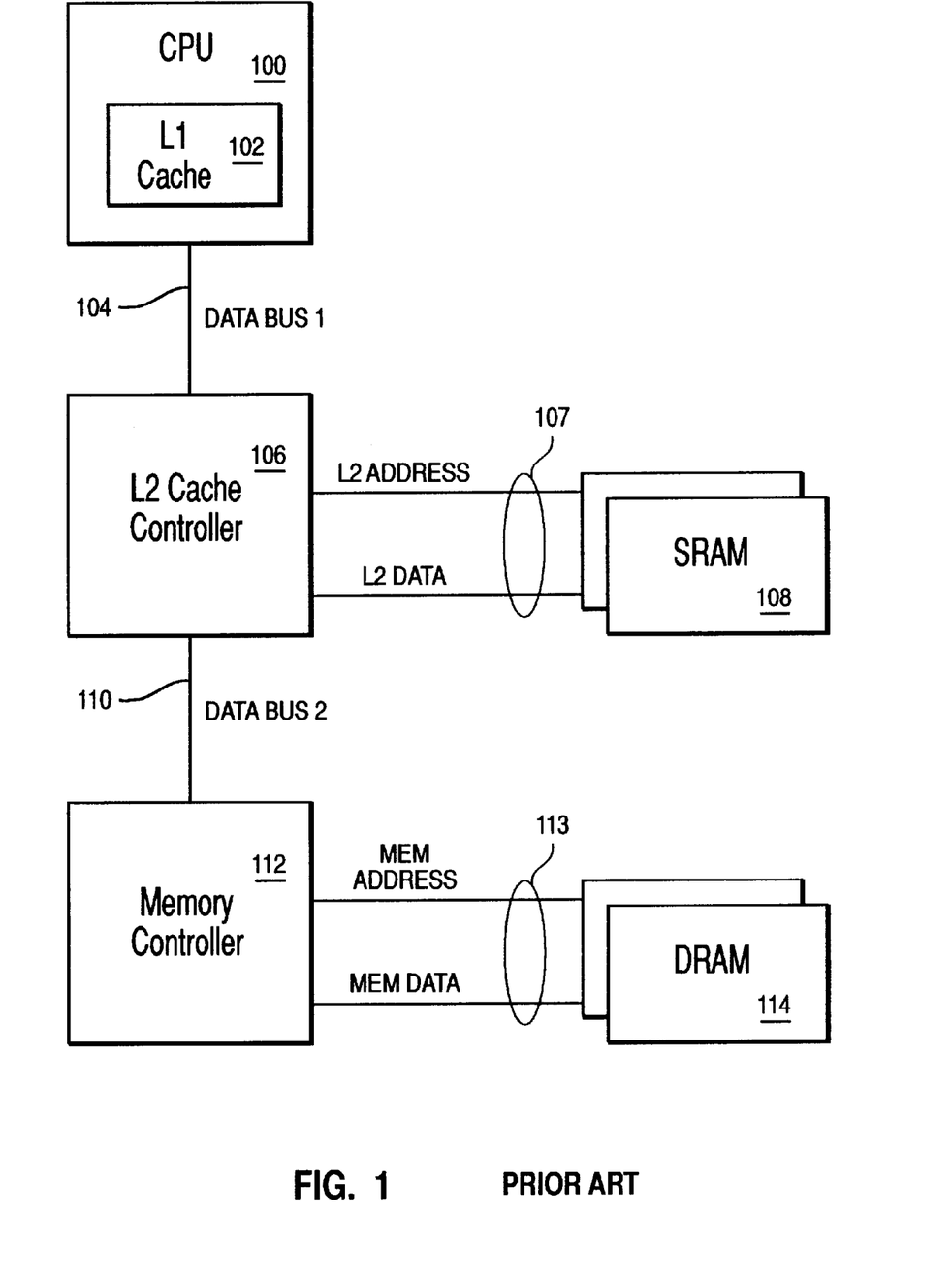
FIG. 1 is a diagram showing the interconnection of devices in a prior art hierarchical memory system.

IBM Technical Disclosure Bulletin, vol. 26, No. 10B, March 1984, pages 5488–5490 discusses at page 5489 a conventional hierarchical memory system wherein an L2 hit indicates data present in the cache and the desired data is then provided to the L1 cache and the output register A typical prior art hierarchical memory system is shown in FIG. 1 wherein a CPU 100 includes a L1 cache 102 and is connected to a stand-alone L2 cache controller 106, via data bus 104. L2 cache controller provides address and control information to L2 cache 108 and data is received from the L2 cache along bus 107. Data bus 110 interconnects L2 cache controller 106 with memory controller 112 which provides address and control information to memory 114. The memory address and control information and data received from memory 114 are transferred to memory controller 112 along bus 113. From viewing the memory system architecture of Figure, it can be seen that for a L2 cache hit, the data must be provided from L2 cache 108 to L2 cache controller 106 and then to CPU 100, i.e. two chip crossings. Thus, this conventional system requires additional clock cycles to move the data from the L2 cache through cache controller 106 and onto data bus 104. Similarly, when a cache miss occurs and the data must be retrieved from memory 114, the data must be moved through memory controller 112 and onto data bus 110, and the data must then be moved through the L2 cache controller before being placed on data bus 104 for use by CPU 100 (i.e. three chip crossings).

Therefore, those skilled in the art will understand how a memory system wherein access to the L2 cache and main memory are simultaneously initiated, but which does not cause the main memory to be accessed when the data is found in the L2 cache, is highly desirable. Further, it can be seen that a memory system wherein unique ports are provided that allow a L2 cache to provide data directly to a processing unit, instead of passing it through a cache controller to a L1 cache, will increase the speed and efficiency of the system. Additionally, a unique port that allows a main memory to be directly connected to a L1 cache in the CPU, rather through a memory controller and cache controller, will also increase system efficiency.

SUMMARY OF THE INVENTION

In contrast to the prior art, the present invention provides a non-hierarchical memory system wherein data retrieval is simultaneously initiated in both the L2 cache and main memory. This allows memory latency associated with arbitration, memory DRAM address translation, and the like to be minimized in the event that the data sought by the processor is not in the L2 (miss). The present invention allows for any memory access to be interrupted in the storage control unit prior to activating any memory control signals.

Therefore, access to the L2 and memory can be initiated simultaneously, but if the data is found in the L2 cache (hit), then the storage control unit can abort the memory access before there is any performance impact. In this manner, the memory does not even know that an access was in progress and can continue doing other work, e.g. DMA transfers and the like. Even if no other memory operations are occurring, there is still a significant performance savings realized because no DRAM access has been started. Those skilled in the art will understand that a DRAM requires a pre-charge time between back to back accesses. Thus, memory operations following the false (L2 Hit) memory operation will not have to be held off due to the pre-charge time of the DRAM.

Also, the present invention provides a unique non-hierarchical memory scheme, wherein the L2 cache provides data or instructions directly to the CPU. In conventional three level memory systems the L2 passes the data/instruction desired by the processor to the L1 cache, which then provides it to the CPU. That is, prior art systems require for data from the main memory to be provided to the CPU via the L2 cache. In other words there is no unique port to the CPU that allows data to be directly provided to the processor. However, in the system of the present invention the L2 cache passes data or instructions directly to the processing unit which has requested the information. At the same time the instructions/data are placed in the L1 cache for subsequent use by the processing units. In this manner, a significant amount of cycles are saved by bypassing the L1 cache.

Broadly, the present invention places the L2 and memory access controls in a single component, e.g. the storage control unit (SCU). In this manner the L2 cache control can communicate the occurrence of a L2 hit to the memory control unit within an extremely short period of time, which allows the memory controller to abort the memory access operation before there is any impact on the main memory itself. That is, the memory access is aborted prior to activating any memory signals. Thus, any following memory operations will not be held off due to a false DRAM pre-charge time, as discussed earlier.

Additionally, the L2 cache of the present invention is connected in parallel to the L1 and the various processing units such that data/instructions ("information") can be provided directly to the processor requesting the information without the added cycles associated with storing the information from the L2 cache in the L1 cache and then retrieving the information from the L1 cache by the processor. A first unique port is provided from the main memory to the L1 cache in the CPU. A second unique port provides direct access between the L2 cache and a register that transfer information between the fixed point unit and floating point unit in the CPU. A level two (L2) cache hit will return data to the CPU in less cycles since there is no additional chip crossings. For example, in the prior art system of FIG. 1, it can be seen that data from L2 108 must be stored in L2 cache controller 106, prior to be provided to CPU 100. A significant amount of processing time is required to retrieve data from L2 108, store it in controller 106 and then provide the data along bus 104 to CPU 100. Cycles are also saved by the present invention, as compared to prior art hierarchical memory systems, when a L2 cache miss occurs. In this case, the data must be retrieved from the main memory. It can be seen in the conventional system of FIG. 1 that data from memory 114 must be passed to memory controller 112, L2 controller 106 and then to CPU 100. In contrast, the present invention provides a unique port which allows the data to be provided directly to the CPU from main memory, when a L2 cache miss occurs.

These and other objects, features and advantages will become apparent to those skilled in the art upon considering the subsequent description taken in conjunction with the attached drawings.

DETAILED DESCRIPTION OF THE PREFERRED EMBODIMENTS

Figure 2:
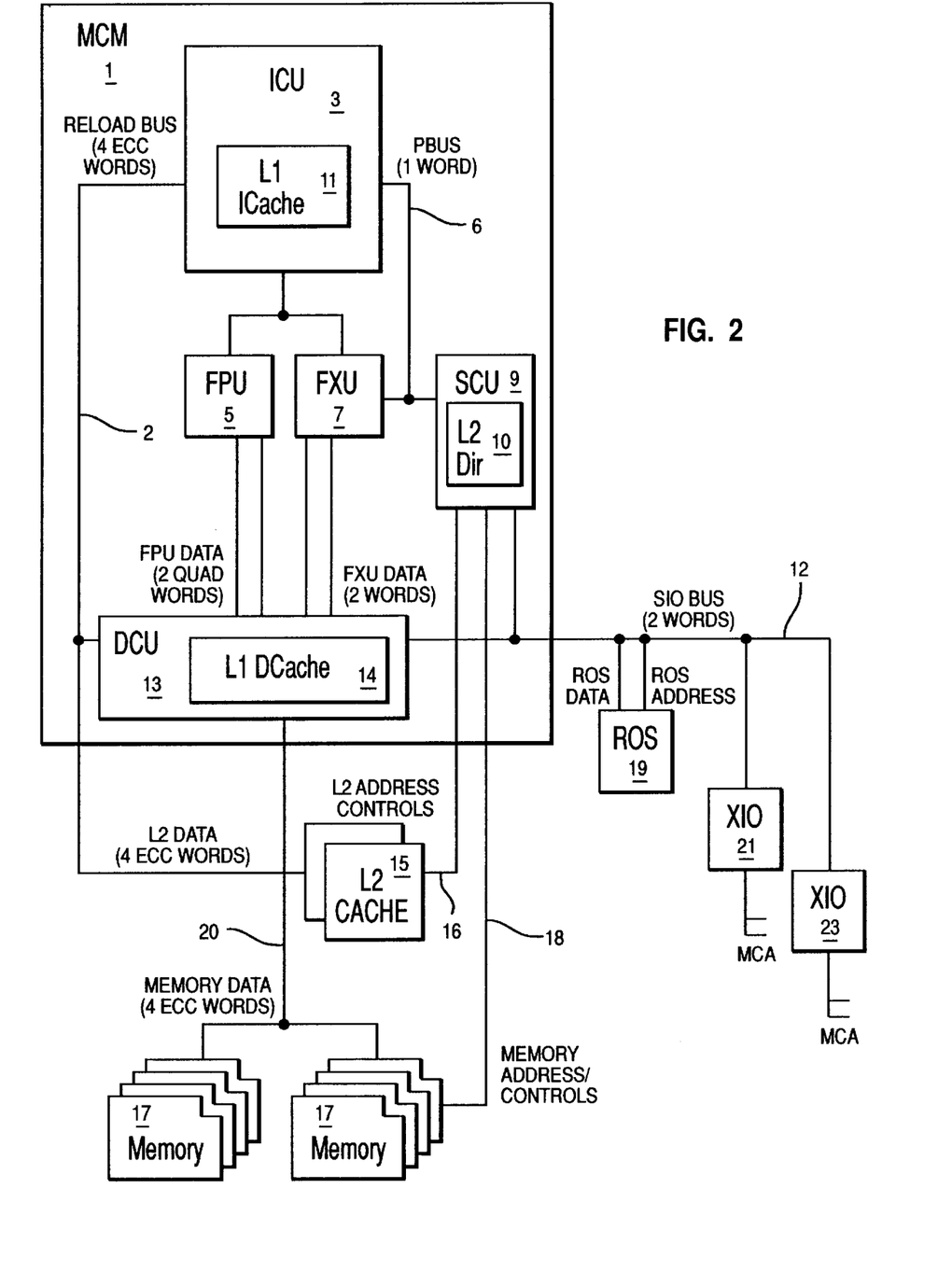
FIG. 2 is a block diagram of a processor system incorporating the present invention, wherein the L1, L2 and main memory are shown.

Referring to FIG. 2, a block diagram of the overall structure of the present invention is shown wherein reference numeral 1 represents a multichip module superscalar processor chip set (CPU), such as is used in a RISC System/6000 workstation manufactured by IBM Corporation (RISC System/6000 is a trademark of IBM). Instruction cache unit 3 includes a branch processing unit 4 (FIG. 4) and a level one instruction cache 11. The branch instruction unit (BIU) and branch processing unit (BPU) process the incoming instructions and dispatch these instructions to the floating point unit (FPU) 5 and fixed point unit (FXU) 7. The BPU provides all of the branching, interrupt, and condition code functions within the system. Those skilled in the art will understand that FPU 5 executes floating-point instructions while FXU 7 executes fixed point arithmetic operations (see IBM RISC System/6000 Technology, published by IBM, 1990, pages 16–42, for a more detailed description of the RISC System/6000 processing unit).

Storage control unit (SCU) 9 controls access between the CPU and the level 2 cache 15 and main memory 17. SCU 9 includes a level 2 cache directory 10 which is used to compare the address of the data or instructions ("information" as used herein will refer to both data and instructions) in the L2 cache with the address of the desired information to determine if a L2 cache hit or miss has occurred. It can be seen from FIG. 2 that SCU 9 does not receive data from either the L2 cache 15 or memory 17. SCU 9 only provides address and control information to the L2 and memory. The unique ports from: (1) L2 15 to DCU 13 and ICU 3; and (2) memory 17 to DCU 13 allow data to be provided directly to the CPU without the overhead associated with intermediately storing the data in SCU 9.

Level one data cache unit (DCU) 13 is connected to FPU 5 and FXU 7 and stores recently accessed data which is likely to be needed again by the FPU or FXU. DCU 13 includes registers, latches and the like (not shown), along with the data cache (D-cache) 14 which only stores data. It can be seen that the architecture of a preferred system implementing the present invention has separated the L1 cache into a data storage component 14 and an instruction component (I-cache) 11. In this way, the data and instructions stored in the L1 cache system are physically closer to the respective processing units which use data and instructions. That is, I-cache 11 is in close physical proximity to BPU 4 (contained in ICU 3) such that instructions stored in I-cache 11 can be easily and quickly provided to, or received from BPU 4. Similarly, D-cache 14 is located close to FPU 5 and FXU 7 which allows these execution units ready access to the data stored in D-cache 14. L2 cache 15 is a plurality of static random access memory (SRAMs) devices which are connected to both the storage control unit 9 and reload bus 2. Requests for information stored in L2 cache 15 are received from SCU 9, and if found in the L2, is provided to the requesting processing unit and the L1 cache along reload bus 2.

The third level of memory is main memory 17 which is a set of dynamic random access memory devices (DRAMs) which are connected to SCU 9, and DCU 13. Main memory 17 is the slowest memory device in the system of the present invention, in that it requires the greatest number of clock cycles to retrieve information therefrom. Memory 17 is connected directly to DCU 13 which allows information from memory to be provided directly to FPU 5 and FXU 7. The information is received in DCU 13 by a register, or the like, and then supplied to the execution units. Of course, the information from memory 17 could also be provided to D-cache 14. If instructions are being received from memory 17, the instruction information is provided from DCU 13 onto reload bus 2 and then to ICU 3. In this manner data and instruction information can be provided directly from memory 17 to processing unit 1.

Also shown in FIG. 2, is PBUS 6 which transmits the requests for data or instructions to SCU 9. System input/output bus (SIO) interconnects DCU 13 (and the various processing units) with the input/output (I/O) control chips (XIO) 21 and 23. These XIO chips 21, 23 coordinate the transfer of data between an external bus, such as the Microchannel (MCA) bus (Microchannel is a trademark of the IBM Corporation) and the internal CPU bus used to interconnect the various processing units. A read only storage (ROS) chip 19 is shown, also connected to SIO bus 12, which provides some of the basic routines and codes used to boot the CPU, such as power on self test (POST) and the like.

Figure 4:
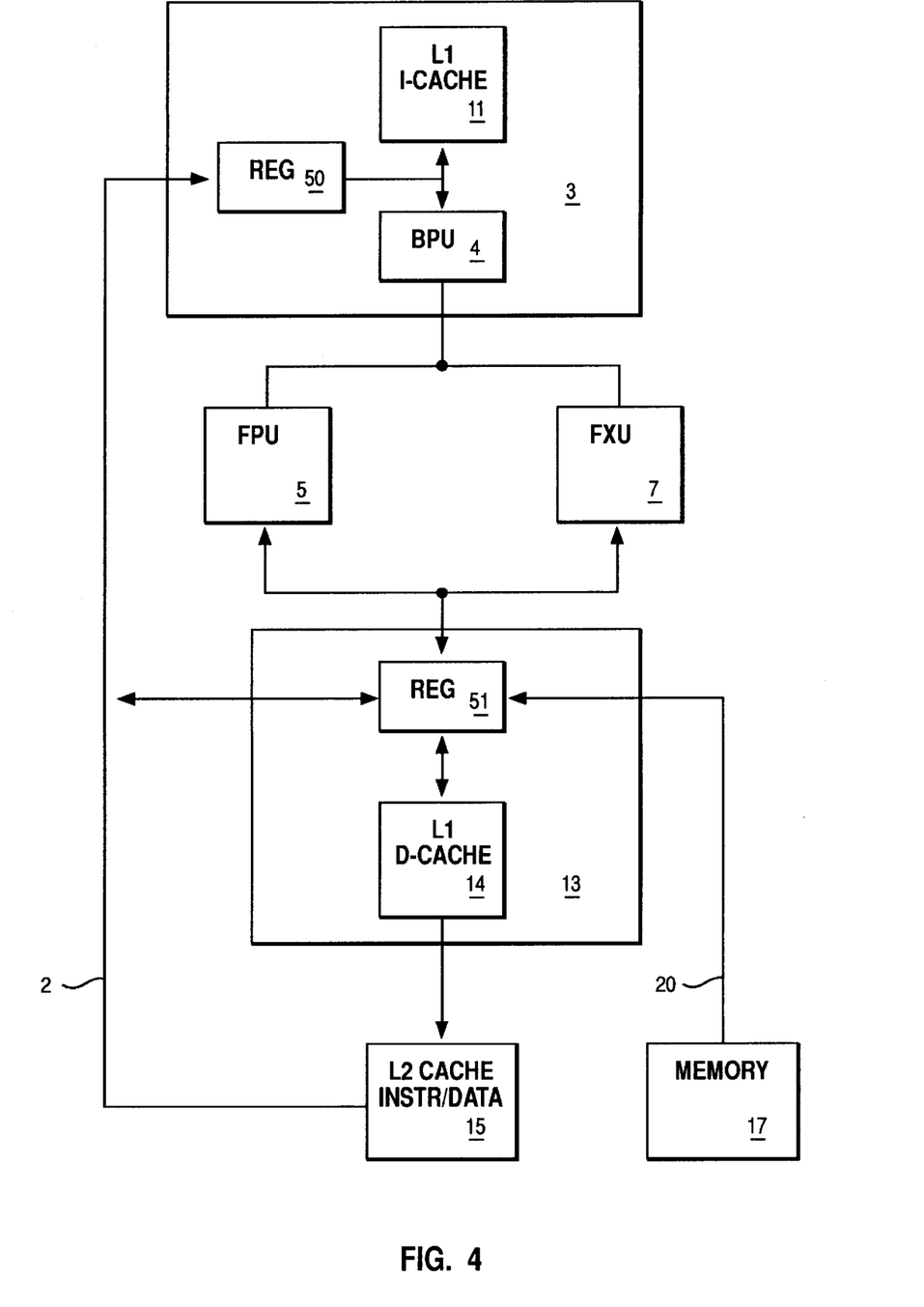
FIG. 4 is a block diagram showing the interconnection of the L1 and L2 caches of the present invention, and the buses which transfer data between the these caches and the various processing units.

It can be seen from FIGS. 2 and 4 that ICU 3 not only sends requests for information to SCU 9, via PBUS 6, but also forwards instructions to FPU 5 and FXU 7 for execution. Both the FPU 5 and FXU 7 are connected to DCU 13 by two quad word buses for transferring information between the L1 cache 14 and the processing units. FXU 7 is also connected to PBUS 6 such that the fixed point unit can also request information from L1 cache 14. Cache 15 receives address and control information off of bus 16 (interconnecting it with SCU 9) and is also connected by reload bus 2 directly to FPU 5 and FXU 7 through register 51 in L1 DCU 13 (see FIG. 4). Additionally, reload bus 2 directly connects L2 cache 15 to BPU 4 in ICU 3 through register 50, as shown in FIG. 4. Main memory 17 receives address and control information off of bus 18 interconnecting it with SCU 9 and is also directly connected to DCU 13 by bus 20. FIG. 2 also illustrates one of the novel features of the configuration of the present invention in that the L2 cache 15 and memory 17 have a unique port into the processing units and L1 cache, respectively. Thus, information from memory 17 is not required to first pass through the L2 cache 15 before being forwarded to the L1 cache. Additionally, the L2 cache has been connected directly to the processing units via reload bus 2 and registers in ICU 3 and L1 DCU 13 (see FIG. 4). This allows information from L2 cache 15 to be moved into the requesting execution unit faster than conventional systems, due to the absence of additional chip crossings. Thus, it can be seen that the present invention is a non-hierarchical memory system wherein the L2 cache is directly connected to the processing units, thus bypassing the L1 cache 14. Further, main memory 17 is directly connected to L1 DCU 13, which bypasses L2 cache 15. When compared with the prior art system of FIG. 1, the main memory also bypasses a memory controller and cache controller such that only a single chip crossing is needed to provide the requested information to the CPU.

Furthermore, the unique ports of the present invention allows separation of the memory bus 20 and reload bus 2 such that any bus loading is minimized. This allows these buses to input information directly to the CPU, as opposed to a controller, or the like. Thus, buses 2 and 20 are capable of being operated at a much faster rate, than conventional systems which tie the entire memory system (e.g. L2 cache and main memory) directly to a single bus that is connected to the CPU.

FIG. 4 shows, in greater detail the non-hierarchical aspect of the present invention. More specifically, ICU 3 is shown with L1 I-cache 11 and BPU 4, along with register 50. It can be seen that I-cache 11 is interconnected to branch processor 4 such that instructions are provided from the cache to BPU 4. Register 50 is directly connected to reload bus 2 and, thus, to L2, cache 15. The ICU is also connected to FPU 5 and FXU 7 such that the BIU can dispatch instructions to the floating point and fixed point units. DCU 13, including D-cache 14 is shown interconnected to FPU 5 and FXU 7 in order for data required for the execution of instructions by these processing units can be quickly obtained. DCU 13 also includes a register 51 which is interconnected to reload bus 2 and L2 cache 15. It can be seen that a preferred embodiment of the present invention partitions the L1 cache into I-cache 11 and D-cache 14 for instructions and data, respectively. These separate partitions are then physically placed close to the processing units which are most likely to require the information stored therein. That is, BPU 4 requires instructions, thus, I-cache 11 is placed near BPU 4. Similarly, FPU 5 and FXU 7 require data, and D-cache 14 is located close to these processing units.

As stated above, conventional hierarchical memory systems provide information from each level of memory to the next memory level sequentially until the information finally reaches the requesting processing unit. However, the present invention allows information found in a level two cache to be directly provided to the requesting processor. For example, if a L2 cache hit occurs on an instruction stored therein, the instruction is provided from L2 15 directly to register 50, via reload bus 2. The instruction is moved into BPU 4 and I-cache 11 simultaneously during the next cycle. Thus, it can be seen that the L1 cache is totally bypassed when a cache hit occurs on an instruction stored in the L2 cache. If the L2 cache hit was for data information, it would be provided to register 51 and then accessed by either FPU 5 or FXU 7, without being previously stored in L1 D-cache 14. Of course, the instruction and data information will be simultaneously stored in I-cache 11 and D-cache 14, respectively, so that the information can be more quickly retrieved the next time it is needed, i.e. information retrieval is faster from the L1 cache than the L2 cache, since the L1 cache is closer to the execution units.

Further, the non-hierarchical nature of the present invention extends to main memory 17. Conventionally, when L1 and L2 cache misses occur and the information is found to be in main memory, that information is then passed to a memory controller, L2 cache controller and finally to the L1 cache for retrieval by the requesting processing unit. In contrast, the present invention provides a unique port which connects the main memory 17 with L1 DCU 13 in the CPU, via bus 20. This direct interconnection of memory 17 with the CPU is implemented by placing both the memory controller and L2 cache controller in SCU 9, which only issues address and control signals. As noted above, conventional systems have a separate cache and memory controller that receive the requested data and require additional chip crossings before the data can be provided to the CPU. These additional chip crossings require a significant amount of overhead in the form of machine cycles due to the generation of address and control signals, as well as, intermediately storing the requested data.

More particularly, it can be seen from FIG. 4 that memory 17 is directly connected to register 51 in DCU 13. This allows data information and instruction information to be provided directly from memory 17 to register 51. Data information will be accessed by the execution units 5 and 7 directly from register 51. However, instruction information will be placed on reload bus 2 for transfer to register 50. The instruction information is then accessed by BPU 4 from register 50. The instruction information and data information is also provided to I-cache 11 and D-cache 14 from registers 50 and 51, respectively, for later use by the execution units.

Data requested by either FPU 5 or FXU 7 can also be directly provided from L2 cache 15, via reload bus 2. That is, when data is requested and a hit occurs in L2 cache 15 the data is placed into register 51 and then subsequently moved into the requesting processing unit (FPU 5 or FXU 7) and L1 D-cache 14 during the next cycle. Although register 51 is physically located in L1 cache chip 13, no L1 latency is associated with storing data from the L2 cache 15 therein, i.e. there is no address translation or the like. Thus, the data from L2 cache 15 and memory 17 bypasses L1 cache 14. In a preferred embodiment, register 51 was placed on the same chip as L1 cache 14 merely for convenience, since there was space available on that device. It would have been impractical to redesign the FPU 5 or FXU 7 to include an additional register. Similarly, providing a separate chip having just a register therein is also undesirable. Those skilled in the art will understand that moving requested instructions and data into L1 I-cache 11 and L1 D-cache 14, respectively will save time, since the information is likely to be needed again.

Figure 3:
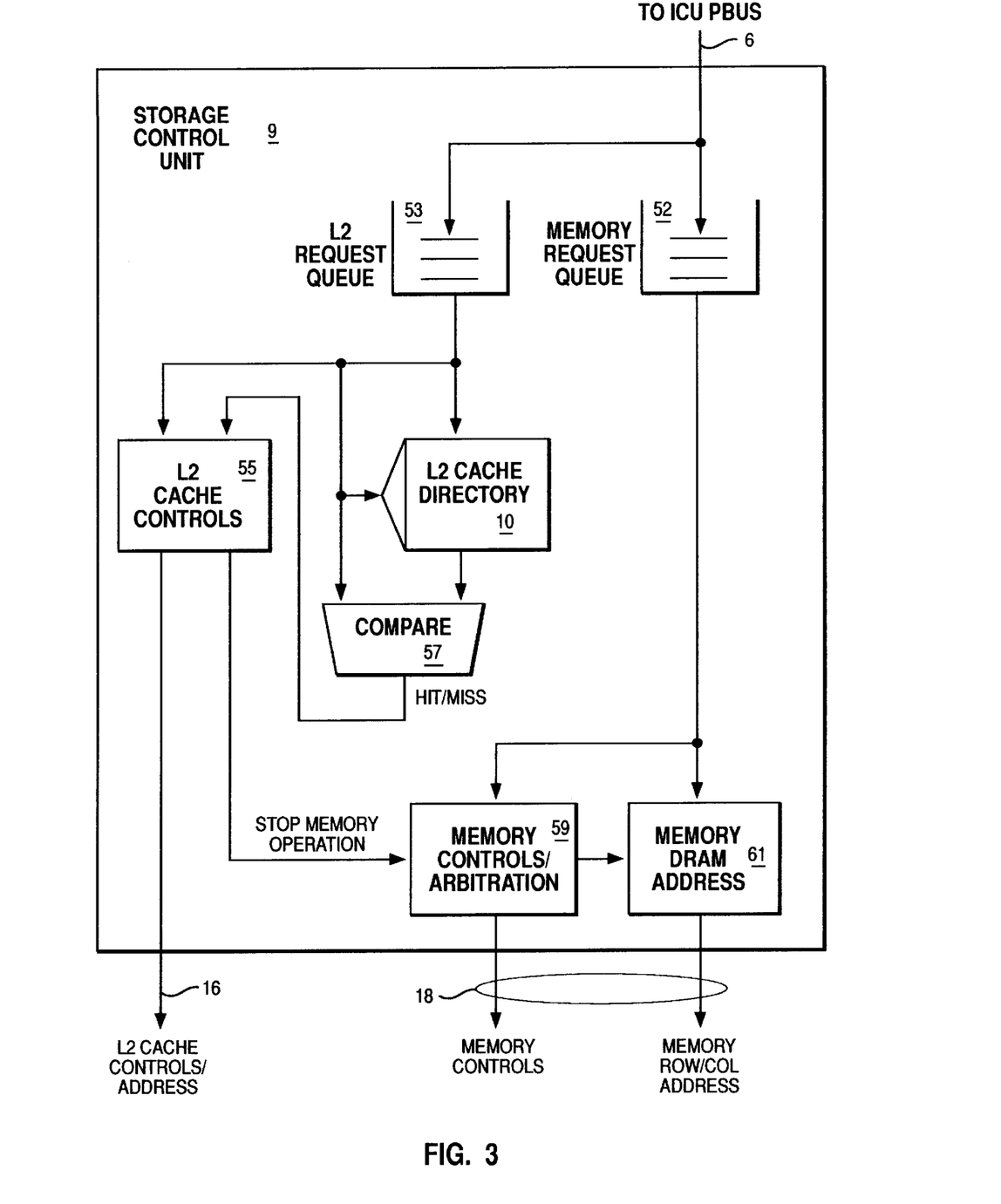
FIG. 3 is block diagram of the storage control unit (SCU) component of the processor of the present invention showing the parallel L2 and main memory access feature.

FIG. 3 is a block diagram of the components which make up SCU 9. PBUS 6 is shown which transmits requests for information from ICU 3 to SCU 9. It can be seen that the information requests are placed in both the L2 request queue 53 and memory request queue 52. Thus, since SCU 9 contains the controller for both the memory 17 and L2 cache 15, the information request from PBUS 6 can be processed in parallel. When the request for information exits queue 53, it is input to both L2 cache directory 10 and comparator 57. The information requested is compared with the locations in L2 cache 15, i.e. directory 10 outputs address tags to comparator 57, which then determines if the information in the cache is that which is requested by ICU 3. If not, a cache miss occurs and memory operations are allowed to complete, i.e. the main memory is searched for the desired information. If the information in the L2 cache is found, by comparator 57 to match the desired information from queue 53, then a cache hit occurs and a hit signal is sent to L2 cache controller 55 which in turn sends a stop memory operation signal to memory controller 59.

The information request from memory request queue 52 is sent to both memory controller 59 and memory DRAM address translator 61 at the same time the request is sent from L2 request queue 53 to L2 cache directory 10. This allows the memory access operations to begin at the same time the L2 cache is being searched for the requested data. This provides an advantage since the latency associated with retrieving information from memory 17 is minimized.

It should be noted that memory controller 59 and L2 cache controller 55 are on the same integrated circuit (IC) device. This allows the stop memory operation signal to be provided directly from L2 cache controller 55 to memory controller 59 in a single cycle. Those skilled in the art will appreciate the enormous savings in cycle time that occurs when a signal is transferred between components on a single IC. There is a large amount of overhead associated with signals transmitted across chip boundaries. For example, both chips must arbitrate for ownership of the bus and then implement a transfer protocol. Thus, by eliminating the chip boundary a large number of clock cycles are saved, which provide increased performance. That is, when a L2 cache hit occurs, the stop memory operation signal is received by memory controller 59 before the memory access operations are complete and any control signals are output to memory 17 on bus 18. Therefore, when a L2 cache hit occurs, the next memory operation will not be delayed since no memory operation signals are activated. For example, an MCA adapter connected to bus 21 or 23 is allowed to continue writing data to main memory 17 during a DMA transfer with no interruptions due to an arbitration occurring for ownership of the memory. Additionally, there is no DRAM perturbation, i.e. the following memory operations are not held off due to pre-charging of the DRAM.

To summarize, not only is the latency associated with memory access minimized by initiating the L2 cache and memory access simultaneously, but the memory availability time is also maximized since the memory is allowed to continue processing when a cache hit occurs. Only when comparator 57 determines that a cache miss exists is the main memory even aware that information is being requested.

Figure 5:
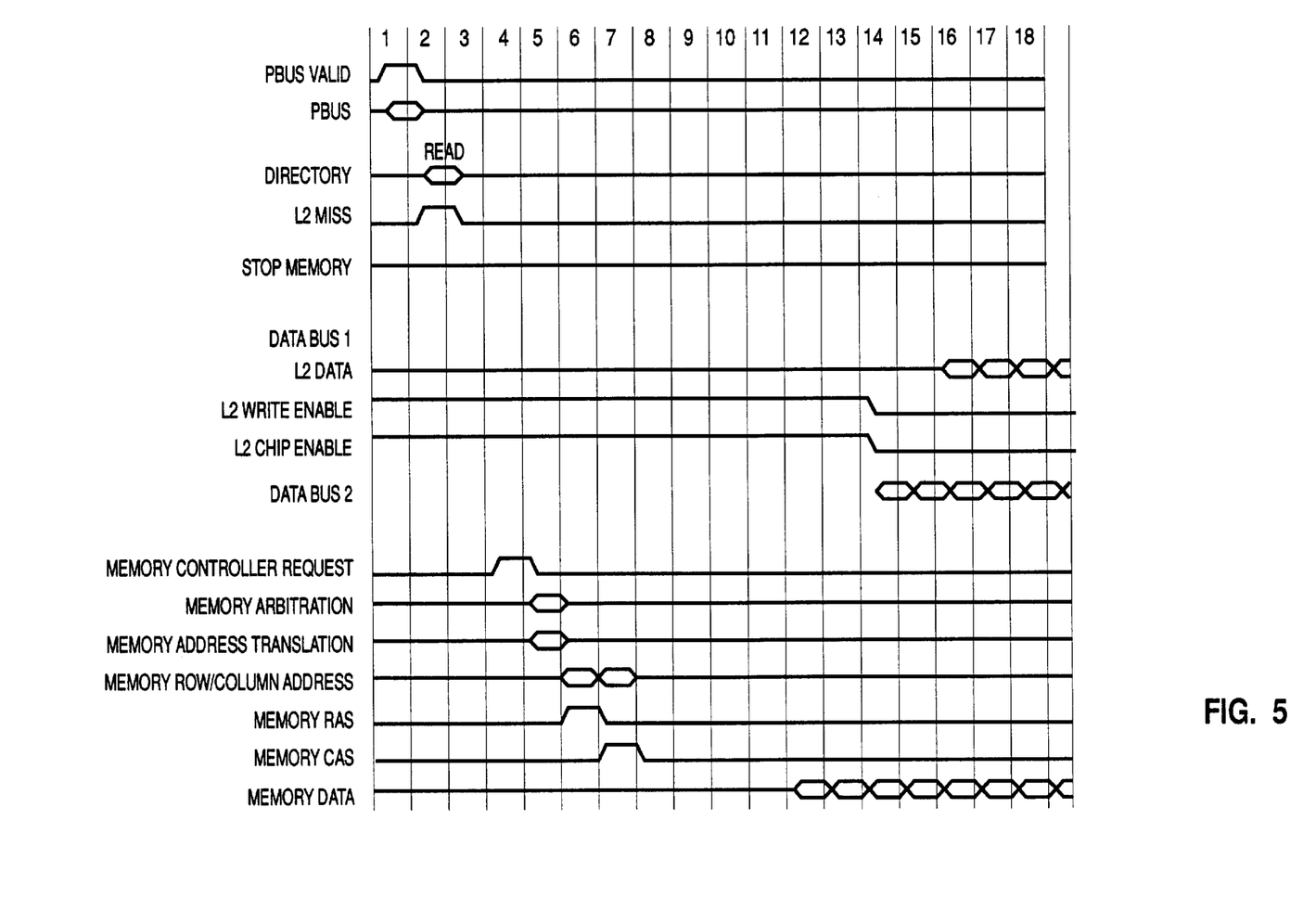
FIG. 5 is a timing diagram showing the CPU cycles needed to access data or instructions in the main memory when a L2 cache miss occurs in a conventional system.

FIG. 5 is a timing diagram showing the cycles used when an L2 cache miss occurs in a conventional system, such as shown in FIG. 1. In cycle 1, a reload request is placed on data bus 104 and during cycle 2 the conventional cache controller 106 determines that a L2 cache miss has occurred. Subsequently, a memory controller request signal goes active during cycle 4 (cycles 3 and 4 were required to communicate the L2 cache miss signal from cache controller 106 to memory controller 112, since a chip crossing occurred), and memory arbitration and DRAM address translation occur during cycle 5 in memory controller 112. In cycles 6 and 7 the Row/Column address is generated, and the row address strobe (RAS) and column address strobe (CAS) signals are activated at cycles 6 and 7, respectively. When these signals are active, the row and column address information is on the bus. Information from the memory is output in cycle 12 to memory controller 112 (on memory data bus 113) and is placed on data bus 110 (data bus 2 of FIGS. 1 and 5) during cycle 14. Another chip crossing is then encountered before the retrieved data can be placed on data bus 104 (data bus 1 of FIGS. 1 and 5) in cycle 16 and moved into L1 cache 102 in CPU 100. It should be noted that two clock cycles were used as the time penalty for moving data between chips, however, other conventional systems may require more than two cycles per chip crossing. Thus, it can be seen that conventional hierarchical memory systems require at least 16 cycles in order for information to be received from main memory when a L2 cache miss has occurred.

Figure 6:
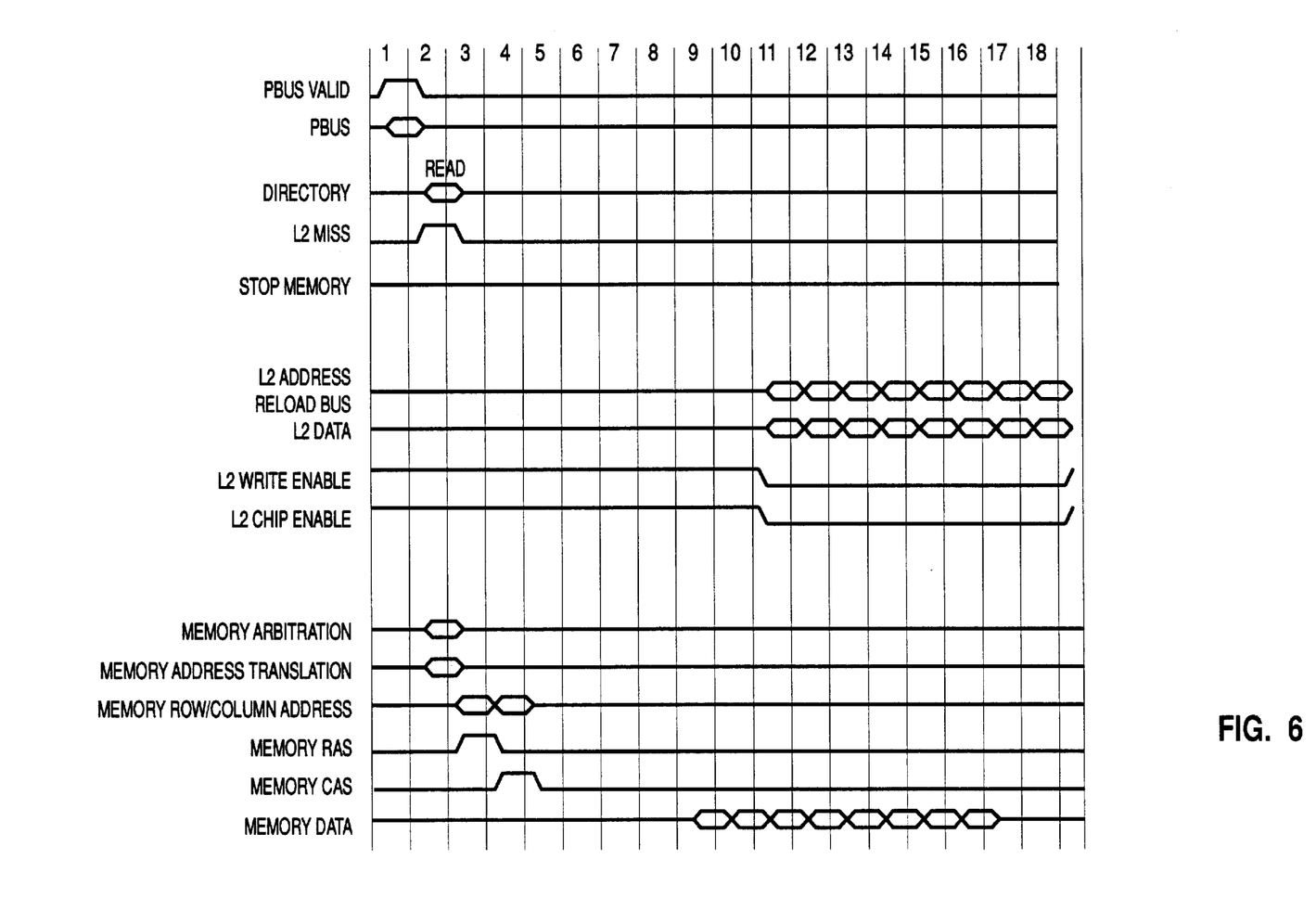
FIG. 6 is a timing diagram showing the CPU cycles needed to access data or instructions in the main memory when a L2 cache miss occurs in the system of the present invention.

Referring to FIG. 6, another timing diagram is shown which illustrates the sequence of control between L2 cache 15 and the main memory 17 of the present invention when a cache miss occurs. During cycle 1, one of the processing units places a reload request on PBUS 6, as shown by the valid PBUS signal, and in cycle 2 SCU 9 loads the requested address and performs a L2 cache directory look-up. The directory tag is compared with its out of the read address sent on PBUS 6 to determine if the request is a hit or a miss. In parallel, during cycle 2, memory arbitration and memory DRAM row/column address generation is performed. In this case it has been assumed that the cache miss has occurred and the STOP_MEMORY signal is not activated, as can be seen in FIG. 6. Therefore, the memory Row/Column address is generated during cycles 3 and 4, and the row address strobe signal is activated in cycle 3. During cycle 4, the column address strobe address is activated. Thus, at cycle 4, the row and column addresses are on the bus (bus 18 of FIG. 2). These signals are then provided by SCU 9 and during cycle 9, memory 17 begins driving information onto the memory data bus 20. At this time, data is provided to DCU 13. If the request to memory was for data, then the present invention only requires 9 cycles to retrieve the data from memory and make it available to D-cache 14 in DCU 13. However if the request was for instructions, they will be placed on the reload bus at cycle 11 and available to I-cache 3 at this time. In any event, the information (including data and instructions) is placed on reload bus 2 at cycle 11 such that the information is provided to the L2 cache. In this manner, the next time this information is requested it will be found in the L2 cache and a cache hit, rather than a L2 cache miss will occur. At cycle 11, the L2 write enable and chip enable signals are activated to allow the information to be simultaneously written to L2 cache 15 in parallel with the write from memory 17 to L1 cache 14 along memory data bus 20 in order to avoid a future cache miss.

Therefore, it can be seen that the system of the present invention allows information to be placed in DCU 13 in only 9 cycles (for data) and on reload bus 2 in only 11 cycles (for instructions), compared to 16 cycles in a conventional system. This is due to the novel aspects of the present invention which provides a unique port for the memory to provide information directly to the CPU.

Figure 7:
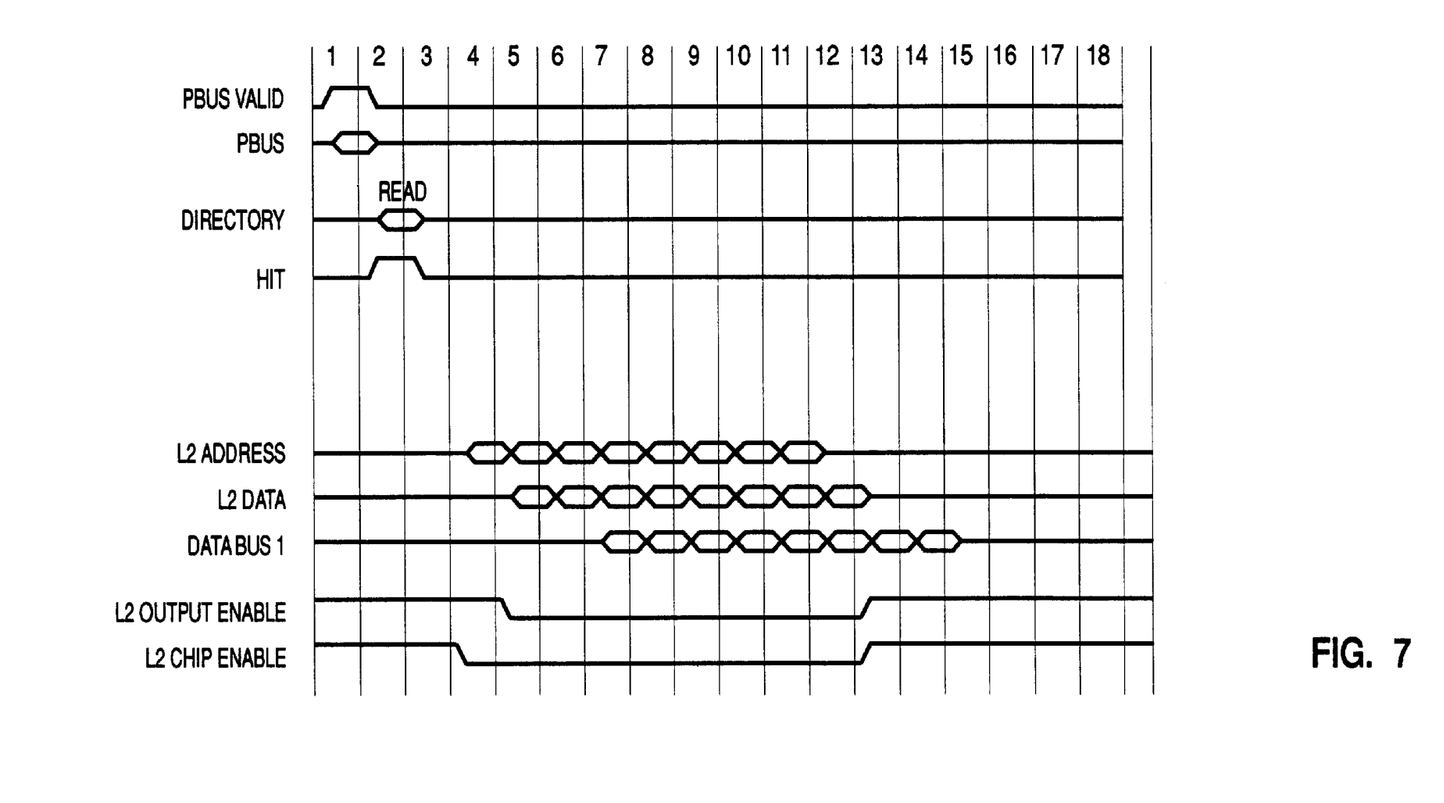
FIG. 7 is a timing diagram showing the CPU cycles needed to access data or instructions in the main memory when a cache hit occurs in a conventional system.

FIG. 7 is a timing diagram showing the timing of a conventional hierarchical memory system, when a L2 cache hit occurs. During cycle 1 the requesting processing unit places a reload request on data bus 104, and in cycle 2, the L2 cache controller 106 does a directory look up and determines that the information is in the L2 cache. The HIT signal is activated in cycle 2 indicating that the information to be retrieved is in the cache. The L2 cache chip enable signal is activated and the L2 address is sent to the L2 cache 108 in cycle 4. In cycle 5, the retrieved information is output from L2 cache 108 to cache controller 106 in cycle 5. The data is subsequently provided to CPU 100 from data bus 104 during cycle 7, due to the additional chip crossing required when the data is provided from L2 cache 108 to cache controller 106, prior to being placed on bus 104. Thus, it can be seen that with a conventional hierarchical memory system, at least 7 cycles elapse before any instructions or data from the L2 cache are placed on data bus 104.

In the prior art shown in FIG. 1, the memory access is so slow that memory operations, e.g. arbitration, memory DRAM address translation, row/column address generation and the like are not even initiated, due to the presence of the information in the L2 cache, i.e. the L2 and memory operations are independent and sequential. However, other conventional systems may initiate the memory access at the same time the cache directory is read (cycle 2). In that case at least three (3) cycles would be added to the memory operations, since an individual cache controller must send a signal to a separate memory controller. The present invention, however, combines the cache controller and memory controller in a single storage control unit (SCU 9) which directly controls the L2 cache and memory. In this manner, the memory operations can be aborted before any signals are sent from SCU 9 to memory 17. Thus, memory 17 may continue normal operations.

Figure 8:
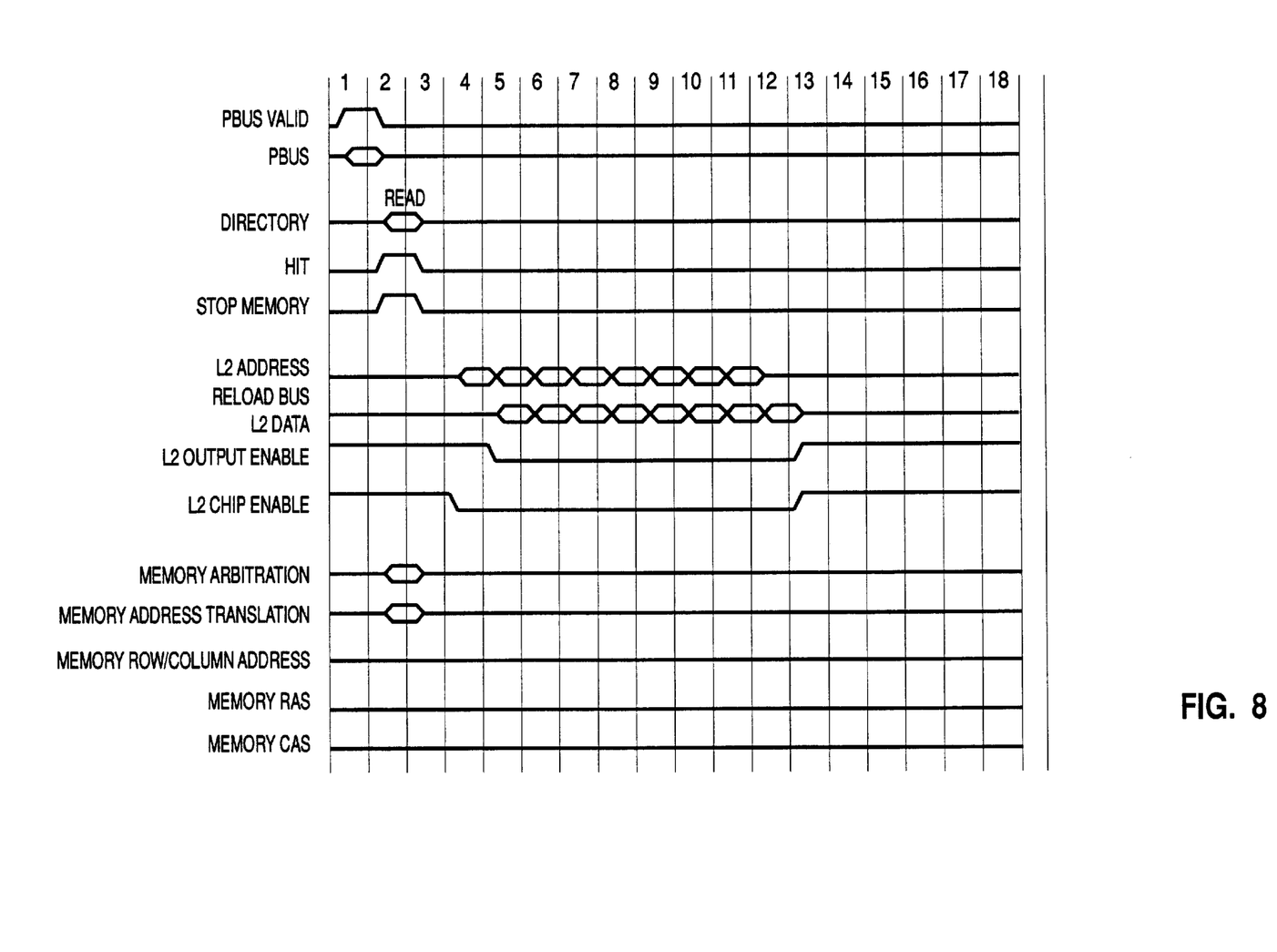
FIG. 8 is a timing diagram illustrating the CPU cycles needed to retrieve data or instructions from an L2 cache in the memory system of the present invention.

FIG. 8 is a timing diagram illustrating how the unique port of the present invention between the L2 cache and the CPU provide data and instructions to the CPU faster than conventional systems. Additionally, FIG. 8 shows how the memory access is stopped prior to any signals being output from SCU 9 to the memory 17, when a L2 cache hit occurs.

During cycle 1, one of the processing units, e.g. FXU 7 or BPU 4, places a reload request on the processor bus PBUS 6 as shown by the PBUS valid signal going active. PBUS 6 then transmits the signal to SCU 9. In cycle 2, SCU 9 loads the address of the requested information and reads the L2 cache directory 10 to perform an L2 cache directory look-up. The directory tag from the directory 10 is then compared with bits from the real address sent on PBUS 6 (using comparator 57 of FIG. 3) to determine if a cache hit or miss has occurred. In parallel, the memory access operations within SCU 9 are initiated at cycle 2. During cycle 2 memory arbitration and memory DRAM row/column address generation is performed. In this case a L2 cache hit has occurred, therefore, a STOP_MEMORY signal is activated to prevent the memory operation from ever being started. The STOP_MEMORY signal blocks the memory Row/Column address from even being generated by SCU 9. Further, the memory RAS and memory CAS are not sent to the memory (see FIG. 6).

During cycle 4, SCU 9 starts the L2 cache read access by activating the L2 chip enable signal and sending the L2 address from SCU 9 to cache 15. Beginning in cycle 5 the information from L2 cache 15 is driven onto the reload bus 2 and sent to the requesting processing unit (see FIG. 2). It can be seen from comparing FIGS. 7 and 8 that conventional hierarchical memories require 7 cycles to retrieve information from a L2 cache, but the present invention only requires 5 cycles, thus saving a substantial amount of processing time. This savings is due to the fact that the unique L2 port allows data to be transferred directly from the cache to the CPU, rather than through an intermediate cache controller chip, or the like.

Although certain preferred embodiments have been shown and described it should be understood that many changes and modifications may be made therein without departing from the scope of the appended claims.

What is claimed is:

1. A computer system including a processing unit, L2 cache and memory, comprising:

a storage control unit including an integrated cache controller and memory controller for controlling operations of said L2 cache and said memory, respectively;

means for simultaneously initiating a first operation to retrieve information from said L2 cache and a second operation to retrieve information from said memory;

means for determining if information required by said processing unit is stored in said L2 cache; and means for aborting said second operation by providing a stop memory operation signal directly from said cache controller to said memory controller concurrent with a determination that said information is in said L2 cache;

wherein said second operation is aborted before any request signals are output to said memory and said memory continues operations independent of said second operation.

2. A system according to claim 1, further comprising means for transferring said information from either said L2 cache or said memory to at least one execution unit contained in said processing unit.

3. A system according to claim 2 wherein said means for transferring comprises:

first means for receiving said information from said L2 cache; and second means for receiving said information from said memory.

4. A system according to claim 3 wherein said first means for receiving comprises:

a cache bus for transmitting said information directly from said L2 cache to said processing unit;

means for storing said information from the L2 cache in said processing unit; and means for accessing said information from the L2 cache by said at least one execution unit.

5. A system according to claim 4 wherein said second means for receiving comprises:

a memory bus for transmitting said information directly from said memory to said process sing unit;

means for storing said information from the memory in said processing unit; and means for accessing said information from the memory by said at least one execution unit.

6. A system according to claim 5 wherein said information comprises data information and instruction information.

7. A system according to claim 6 wherein said first and said second means for receiving further comprise:

means for storing said data information in a data cache unit internal to said processing unit; and means for storing said instruction information in an instruction cache unit internal to said processing unit.

8. A system according to claim 7 wherein said first and second means for receiving further comprise:

means for concurrently storing said data information in said internal data cache when said data information is directly provided to said at least one execution unit; and means for concurrently storing said instruction information in said internal instruction cache when said instruction information is directly provided to said at least one execution unit.

9. A system according to claim 2 wherein said means for transferring comprises means for bypassing an internal cache included in said processing unit.

10. A memory system according to claim 1 wherein said means for aborting comprises means for preventing any memory operation signals from being transmitted to said memory when said information is in said L2 cache any memory access operations being transmitted from said.

11. A method of transferring information between a processing unit of a computer system and an L2 cache and memory, comprising the steps of:

controlling said L2 cache and said memory by a cache controller and memory controller, respectively, which are integrated on a storage control unit;

simultaneously initiating a first operation to retrieve information from said L2 cache and a second operation to retrieve information from said memory;

determining if information required by said processing unit is stored in said L2 cache; and aborting said second operation by providing a stop memory operation signal directly from said cache controller to said memory controller concurrent with a determination that said information is in said L2 cache;

wherein said second operation is aborted before any access signals are output to said memory wherein said memory continues operations independent of said request.

12. A method according to claim 11 further comprising the step of transferring said information from either said L2 cache or said memory to at least one execution unit contained in said processing unit.

13. A method according to claim 12 wherein said step of transferring comprises the steps of:

receiving said information from said L2 cache; and receiving said information from said memory.

14. A method according to claim 13 wherein said step of receiving information from said L2 cache comprises the steps of:

transmitting said information directly from said L2 cache to said processing unit;

storing said information from the L2 cache in said processing unit; and accessing said information from the L2 cache by said at least one execution unit.

15. A method according to claim 14 wherein said step of receiving information from said memory comprises the steps of:

transmitting said information directly from said memory to said processing unit;

storing said information from the memory in said processing unit; and accessing said information from the memory by said at least one execution unit.

16. A method according to claim 15 wherein said information comprises data information and instruction information.

17. A method according to claim 16 wherein said step of receiving information from said L2 cache and the step of receiving information from said memory further comprise the steps of:

storing said data information in a data cache unit internal to said processing unit; and storing said instruction information in an instruction cache unit internal to said processing unit.

18. A method according to claim 17 wherein said step of receiving information from said L2 cache and the step of receiving information from said memory further comprise the steps of:

concurrently storing said data information in said internal data cache when said data information is directly provided to said at least one execution unit; and concurrently storing said instruction information in said internal instruction cache when said instruction information is directly provided to said at least one execution unit.

19. A method according to claim 12 wherein said step of transferring comprises the step of bypassing an internal cache included in said processing unit.

20. A method according to claim 11 wherein said step of aborting comprises the step of preventing any memory operation signals from being transmitted to said memory when said information is in said L2 cache.

* * * * *